United States Patent
Prakash et al.

(10) Patent No.: US 12,317,342 B2
(45) Date of Patent: May 27, 2025

(54) DEVICE-TO-DEVICE WIRELESS COMMUNICATION

(71) Applicant: SINGAPORE UNIVERSITY OF TECHNOLOGY AND DESIGN, Singapore (SG)

(72) Inventors: Jay Prakash, Singapore (SG); Tony Quee Seng Quek, Singapore (SG); Andrei Bytes, Singapore (SG); Jianying Zhou, Singapore (SG); Jemin Lee, Singapore (SG)

(73) Assignee: Singapore University of Technology and Design, Singapore (SG)

( * ) Notice: Subject to any disclaimer, the term of this patent is extended or adjusted under 35 U.S.C. 154(b) by 432 days.

(21) Appl. No.: 17/776,745

(22) PCT Filed: Nov. 16, 2020

(86) PCT No.: PCT/SG2020/050662
§ 371 (c)(1),
(2) Date: May 13, 2022

(87) PCT Pub. No.: WO2021/096433
PCT Pub. Date: May 20, 2021

(65) Prior Publication Data
US 2022/0386397 A1     Dec. 1, 2022

(30) Foreign Application Priority Data
Nov. 14, 2019   (SG) ............................ 10201910639V

(51) Int. Cl.
*H04W 76/14*   (2018.01)
*H04L 9/08*     (2006.01)
(Continued)

(52) U.S. Cl.
CPC ............ *H04W 76/14* (2018.02); *H04L 9/0838* (2013.01); *H04W 12/041* (2021.01);
(Continued)

(58) Field of Classification Search
None
See application file for complete search history.

(56) References Cited

U.S. PATENT DOCUMENTS

| | | | |
|---|---|---|---|
| 2015/0098392 A1* | 4/2015 | Homchaudhuri | H04W 48/20 370/329 |
| 2015/0110052 A1 | 4/2015 | Venkatachalam et al. | |

(Continued)

FOREIGN PATENT DOCUMENTS

CN    106059758 A    10/2016

OTHER PUBLICATIONS

Wi-Fi Peer-to-Peer (P2P) Technical Specification Version 1.5; Wi-Fi Alliance (Year: 2014).*

(Continued)

*Primary Examiner* — Chris Parry
*Assistant Examiner* — Abderrahmen Chouat
(74) *Attorney, Agent, or Firm* — Barnes & Thornburg LLP; Jerry C. Harris, Jr.

(57) ABSTRACT

A method of establishing a direct wireless communication link between a first device and a second device (the first device being designated as a sender and the second device being designated as a receiver) comprises: a proximity authentication operation that comprises determining, based on signals received by the first and second devices over one or more RF channels from a plurality of wireless access points, that the first device is proximate the second device; following the proximity authentication operation, a key generation operation that comprises: generating a shared secret by performing randomness extraction on respective
(Continued)

signals received at the first and second devices over a selected channel of the one or more RF channels; and establishing the direct wireless communication link using the shared secret.

17 Claims, 13 Drawing Sheets

(51) Int. Cl.
    *H04W 12/041*     (2021.01)
    *H04W 12/06*     (2021.01)
    *H04W 12/50*     (2021.01)
    *H04W 12/63*     (2021.01)
    *H04W 48/16*     (2009.01)
    *H04W 84/12*     (2009.01)

(52) U.S. Cl.
    CPC ........... *H04W 12/06* (2013.01); *H04W 12/50* (2021.01); *H04W 12/63* (2021.01); *H04W 48/16* (2013.01); *H04W 84/12* (2013.01)

(56) References Cited

U.S. PATENT DOCUMENTS

2017/0150298 A1     5/2017     Bandyopadhyay et al.
2017/0332192 A1*   11/2017   Edge ..................... G01S 5/0036
2019/0104121 A1*    4/2019   Khandani ............. H04L 9/0891

OTHER PUBLICATIONS

Wenlong Shen, Bo Yin, Xianghui Cao, Lin X. Cai, and Yu Cheng, Secure Device-to-Device Communications over WiFi Direct; IEEE (Year: 2016).*
Shen W., et al., Secure Device-to-Device Communications over Wifi Direct., IEEE Network, Sep. 29, 2016, vol. 30, No. 5, pp. 4-9.
Chevassut O., et al., Key Derivation and Randomness Extraction, IACR Cryptology ePrint Archive, Report 2005/061, Mar. 19, 2005, pp. 1-25.
Intellectual Property Office of Singapore, International Search Report issued in PCT/SG2020/050662, Jan. 27, 2021, 3 pages.
Intellectual Property Office of Singapore, Written Opinion issued in PCT/SG2020/050662, Jan. 27, 2021, 3 pages.

* cited by examiner

DEVICE-TO-DEVICE WIRELESS COMMUNICATION

RELATED APPLICATIONS

This application is a National Stage application of International Application No. PCT/SG2020/050662, filed Nov. 16, 2020, the entire contents of which is hereby incorporated herein by reference. This application also claims benefit under 35 U.S.C. § 119 Singapore application no. 10201910639V, filed on 14 Nov. 2019, the entire contents of which are hereby incorporated by reference.

BACKGROUND

The present disclosure relates to device-to-device data communication over a direct wireless connection.

Device-to-Device (D2D) communications, for example implemented via WiFi Direct (also known as WiFi P2P), are becoming increasingly prominent. The adoption of 5G is expected to drive cellular networks from centralised to device-centric infrastructure, where cellular, in-band, and out-band D2D would co-exist. D2D communications facilitates a direct connection between compatible radio-frequency (RF) devices, without the need for association with access points (APs) or cellular base stations. The popularity of proximity-based services, applications and unprecedented traffic load on the cellular infrastructure have stimulated the development of technologies such as LTE-Direct, Flash-LinQ by Qualcomm, and Proximity Services (ProSe) by Third Generation Partnership Project (3GPP).

The user base and use cases of Wi-Fi Direct have increased dramatically since its introduction by the Wi-Fi Alliance and its subsequent integration into Android 4.0. Modern D2D communication leverages a high data rate and is beneficial for mobile-to-mobile file sharing, wireless printing, screen-casting, and a wide range of other domains. Billions of consumer devices presently use Wi-Fi Direct as an out-band (ISM) D2D protocol to exchange information with other devices directly, without needing a global network connection.

The use of Wi-Fi Direct provides significant usability benefits, compared to Peer-to-Peer (P2P) communication over a conventional Wi-Fi access point. The user is able to keep the primary Wi-Fi connection working simultaneously with Wi-Fi Direct data transfer. Further, the user flow for associating devices to start a transfer is simple and convenient.

Given the large number of WiFi Direct connections, ensuring security and appropriate adoption by users is critically important. D2D sharing applications are very popular, mostly because of the data transfer speed over a direct D2D RF link and their comparative ease of use. On the other hand, messenger and mailing services are less popular due to the number of steps needed to transmit messages, lengthy identifiers (email addresses, phone numbers) that are needed to identify the sender and receiver, and the need to share contact details at first contact. The mental burden required for the exchange of digital information is therefore much greater in some contexts than in others, creating a usability problem. This creates exploitation opportunities for economic benefits at the cost of security and privacy.

More generally, there remains a need for a means of direct communication between devices, whether this involves human or inanimate objects, printers, payment systems, or cyber-physical systems (CPS), which is both usable and secure.

SUMMARY

The present disclosure relates, in a first aspect, to a method of establishing a direct wireless communication link between a first device and a second device, the first device being designated as a sender and the second device being designated as a receiver, the method comprising:
  a proximity authentication operation that comprises determining, based on signals received by the first and second devices over one or more RF channels from a plurality of wireless access points, that the first device is proximate the second device;
  following the proximity authentication operation, a key generation operation that comprises: generating a shared secret by performing randomness extraction on respective signals received at the first and second devices over a selected channel of the one or more RF channels; and
  establishing the direct wireless communication link using the shared secret.

The direct wireless communication link may be a WiFi Direct link.

The method may further comprise introducing, prior to the key generation operation, randomness in the physical layer of the first device and/or of the second device. For example, randomness may be introduced by imparting movement to an antenna of the first device and/or an antenna of the second device. This may be by a first user gesturing with the first device and/or a second user gesturing with the second device. By introducing said randomness, security of the key generation process, and thus of the link established between the devices, is improved.

The method may comprise a device discovery operation that comprises:
  the second device:
    waiting in a listen state for a predetermined wait time in a current channel of said RF channels;
    if no probe is detected from the first device during the predetermined wait time, setting the current channel to another of said RF channels;
    if a probe is detected from the first device during the predetermined wait time from the first device, sending a response to the first device over the current channel; and
    the first device setting, responsive to the response from the second device, the current channel as a search state channel.

In some embodiments, the proximity authentication operation comprises the second device broadcasting a secure sketch of signal data received by the second device from the plurality of wireless access points; and the first device determining, based on the secure sketch and on signal data received by the first device from the plurality of wireless access points, whether the first device is proximate the second device.

In some embodiments, the proximity authentication operation comprises scanning for said plurality of wireless access points over a subset of frequently used channels. By scanning only a subset of frequently used channels, sufficient data may be collected for the authentication process without expending excessive time in the scanning process (which would otherwise cause a bottleneck by delaying the initiation of data transfer).

In some embodiments, the proximity authentication operation further comprises selecting, from said plurality of access points, a subset of access points that are suitable for authentication. For example, access points that have small angular range and/or that have large angular range with respect to the first device and the second device may be discarded. In this way, security of the process may be further improved, since access points that are very close or very far may result in a lower signal correlation between the two devices.

The present disclosure also relates, in a second aspect, to a device configured to establish a direct wireless communication link with another device, the device comprising at least one processor in communication with computer-readable storage that comprises instructions for causing the at least one processor to:

perform a proximity authentication operation that comprises receiving signal data from the another device, said signal data being indicative of signals received by the another device over one or more RF channels from a plurality of wireless access points; and determining, based on signals received by the device over the one or more RF channels from the plurality of wireless access points, that the device is proximate the another device;

following the proximity authentication operation, perform a key generation operation that comprises: generating a shared secret by performing randomness extraction on signals received at the device over a selected channel of the one or more RF channels; and establishing the direct wireless communication link with the another device using the shared secret.

The direct wireless communication link may be a WiFi Direct link.

The device may comprise an antenna that is polarised such that movement of the device introduces randomness in the physical layer of the device.

The device may be configured to perform a device discovery operation that comprises:

when the device is in a send mode, successively transmitting probes over a plurality of channels until a first response is received from the another device over one of said channels, and responsive to the response from the another device, setting a search state channel to be the one of said channels; and when the device is in a receive mode:

waiting in a listen state for a predetermined wait time in a current channel of said RF channels;

if no probe is detected from the another device during the predetermined wait time, setting the current channel to another of said RF channels;

if a probe is detected from the another device during the predetermined wait time, sending a response to the another device over the current channel.

In some embodiments, the proximity authentication operation comprises:

when the device is in a send mode, receiving, from the another device, a secure sketch of signal data received by the another device from the plurality of wireless access points; and determining, based on the secure sketch and on signal data received by the device from the plurality of wireless access points, whether the device is proximate the another device.

In some embodiments, the proximity authentication operation comprises scanning for said at least one access point over a subset of frequently used channels.

In some embodiments, the proximity authentication operation further comprises selecting, from said at least one access point, one or more access points that are suitable for authentication.

In some embodiments, said selecting comprises discarding access points that have small angular range and/or that have large angular range with respect to the device and the another device.

The present disclosure further relates, in a third aspect, to non-transitory computer-readable storage having stored thereon instructions for causing at least one processor to perform a method as disclosed herein.

BRIEF DESCRIPTION OF THE DRAWINGS

Some embodiments of a method for establishing a direct wireless communication link between two devices, and of a device configured for direct wireless communication with other devices, in accordance with present teachings will now be described, by way of non-limiting example only, with reference to the accompanying drawings in which.

DETAILED DESCRIPTION

In general terms, the present disclosure relates to a method of securely sharing data over a direct wireless communication link between two devices which are in proximity to each other, and where users of the two devices do not need to enter a PIN or other code for pairing. The method may involve an operation of authenticating proximity between the two devices using signals from a plurality of wireless access points that are in range of the two devices, and an operation of shared secret agreement, where the shared secret is generated by randomness extraction performed on measured signals from the wireless access points.

Figure 1:
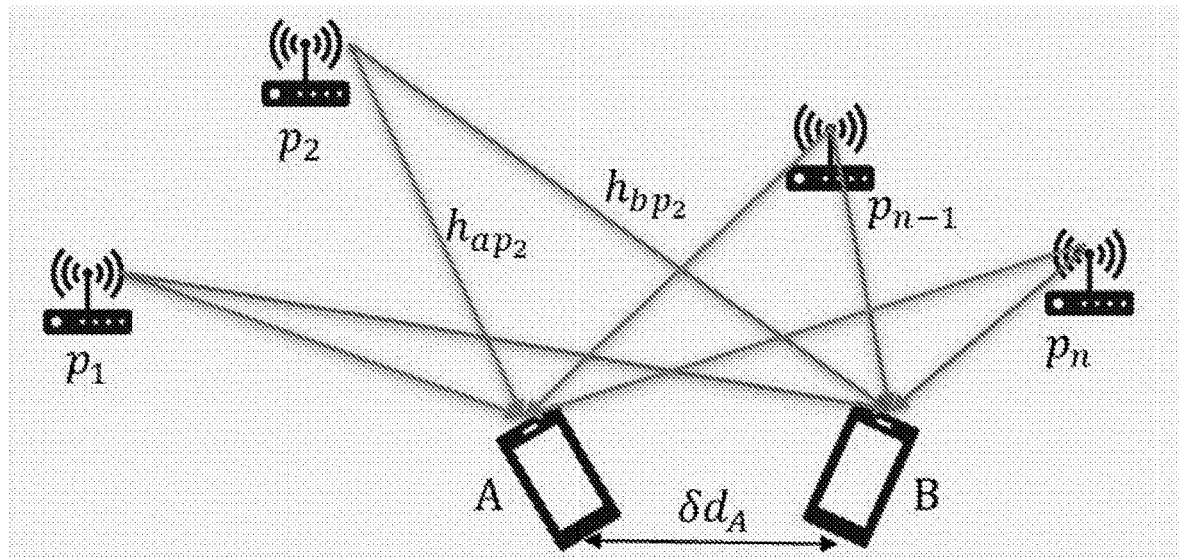
FIG. 1 is a schematic diagram of a pair of devices communicating with each other over a direct wireless communication link, and using a plurality of nearby wireless access points for proximity authentication.

FIG. 1 shows a schematic depiction of an example context in which embodiments of the present disclosure may be implemented. A sender device, denoted by A, wishes to share data with a receiver device, denoted by B and located a distance $\delta d_A$ away from A (it will also be appreciated that the roles of A and B may be reversed as desired). The devices A and B are depicted as smartphones in this example. However, it will be appreciated that either or both of these devices may be any other kind of device which is capable of communicating with other devices via RF-based communication protocols (such as WiFi Direct), and that the present disclosure may be adapted accordingly to suit the particular device types between which communication is desired.

The sender A and receiver B are both in proximity of a plurality n of wireless access points (APs) $p_1, p_2, \ldots, p_{n-1}, p_n$. For example, A sees signals $h_{ap_2}$ from AP $p_2$, and B sees signals $h_{bp_2}$ from AP $p_2$.

A and B may measure and analyse signals from all of the APs, or from just a subset of them, for the purposes of proximity authentication and/or shared secret agreement. Further, signals from only a subset of available channels may be measured and/or analysed. For example, scanning of 802.11 channels may be restricted to a subset of the most commonly used channels. The subset may be determined in advance by mapping the channels used by all access points in a given geographical area. In some embodiments, device A and/or device B may periodically perform a background scan to update the subset of channels to be used.

Figure 2:
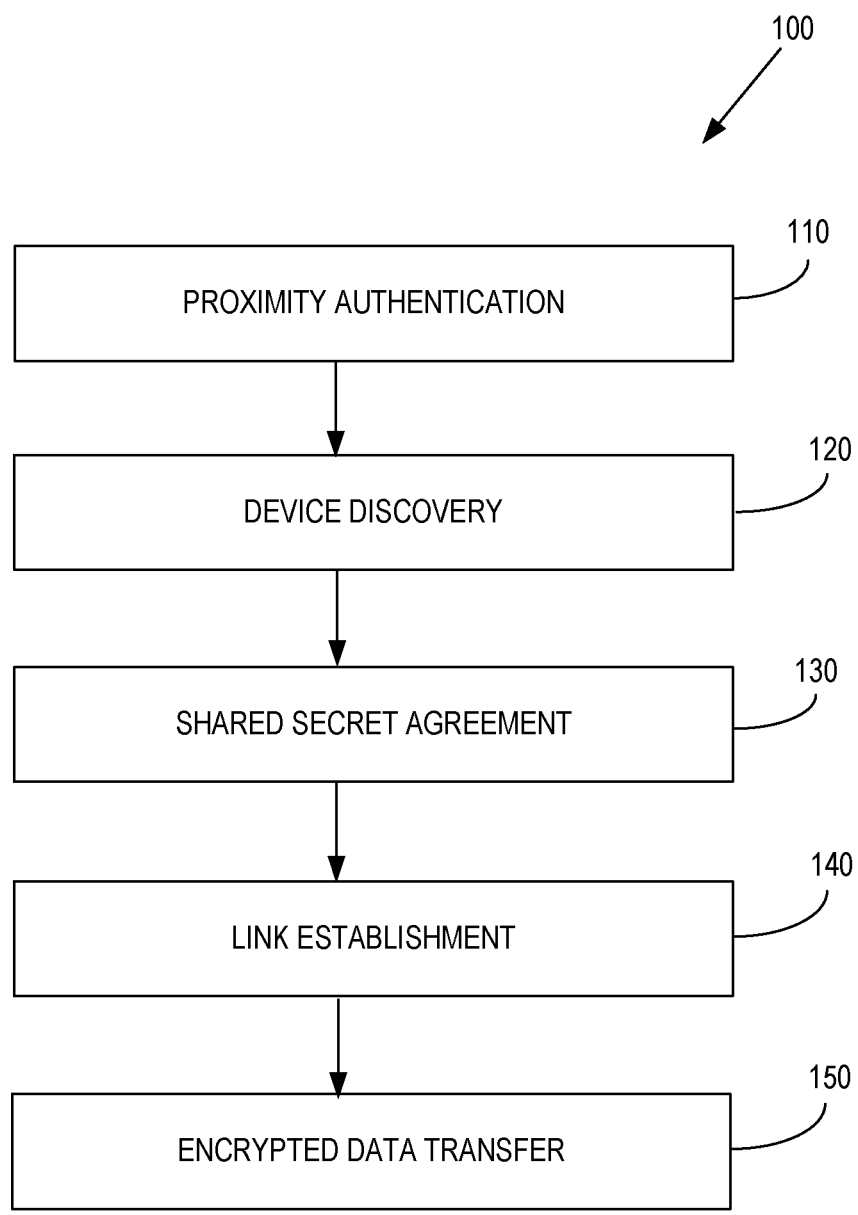
FIG. 2 is a flow diagram of an example method for establishing a direct wireless communication link between a pair of devices, and effecting a data transfer between them.

FIG. 2 shows a high-level flow diagram of a data sharing process 100 according to certain embodiments. The process 100 comprises a proximity authentication operation 110, in which the sender A and receiver B, having the intention to share information (for example, each having initiated a software application configured for this purpose), start by scanning wireless channels, such as 802.11 channels, to identify nearby visible APs. As an exhaustive search over 32 channels (for the 802.11 set of protocols) not only puts unnecessary load on battery and computation, but is also time-intensive, a subset of channels may be scanned as mentioned above. The present inventors have found that typically, a large percentage (approximately 50%) of APs in any given area of Singapore belong to only a few channels, for example channels 1, 6, and 11. This number and the channel indices may vary across countries. Considering the trade-off between scan cost and number of APs, the N most populated channels may be picked for measurements.

Next, once A and B have verified that they are in proximity to each other, a device discovery operation 120 is performed. The device discovery operation 120 comprises the sender A and receiver B exchanging probe and response messages to establish a channel over which a link will be established. This may be followed by group owner (GO) negotiation (not shown) to determine which of A or B should become the GO to act as the AP for the connection.

Next, an operation 130 to establish a shared secret is performed. This comprises performing shared randomness extraction on the respective signals measured by A and B. In some embodiments, A and/or B may introduce randomness into the measured signals by gesturing, for example by one or both users gesturing with their mobile devices, such as by waving, bumping, high-fiving, etc. Randomness is introduced by virtue of the fact that devices A and B both comprise antennas, and gesturing by one or both changes the antenna polarisation in the RF channel between the sender and receiver antenna pairs. The present inventors have found that waving and bumping generate the highest randomness in inertial measurement unit (IMU) measurements, while waving also generates a high degree of randomness in wireless channel observations.

In embodiments where human interaction with the devices that are to communicate wirelessly is undesirable or not possible, the physical layer randomness may be introduced by alternative mechanisms. For example, where one or both devices are components of a cyberphysical system such as an industrial control system, or are other types of IoT device such as components of a smart home system, the physical layer randomness may be introduced by imparting movement to an antenna of the first device and/or an antenna of the second device. Movement may be imparted by, for example, a programmable motor that is mounted to the antenna of the first/second device so that the antenna alone can be moved, or by a programmable motor that is mounted to the first/second device (e.g., to a housing thereof), so that the first/second device can be moved as a whole unit.

Once the generated shared secret is mutually authenticated by A and B, a link between A and B can be established in operation 140. This may involve operations typical for protocols such as WiFi Direct, including DHCP exchange to set up IP addresses for A and B, and the like. A may then send data to B over the established link, using the shared secret generated in operation 130 for encryption and decryption as needed.

At block 150, sender A transmits encrypted data to receiver B, which can decrypt the date using the shared secret (session key).

Further details of each of these operations will now be described.

Figure 3:
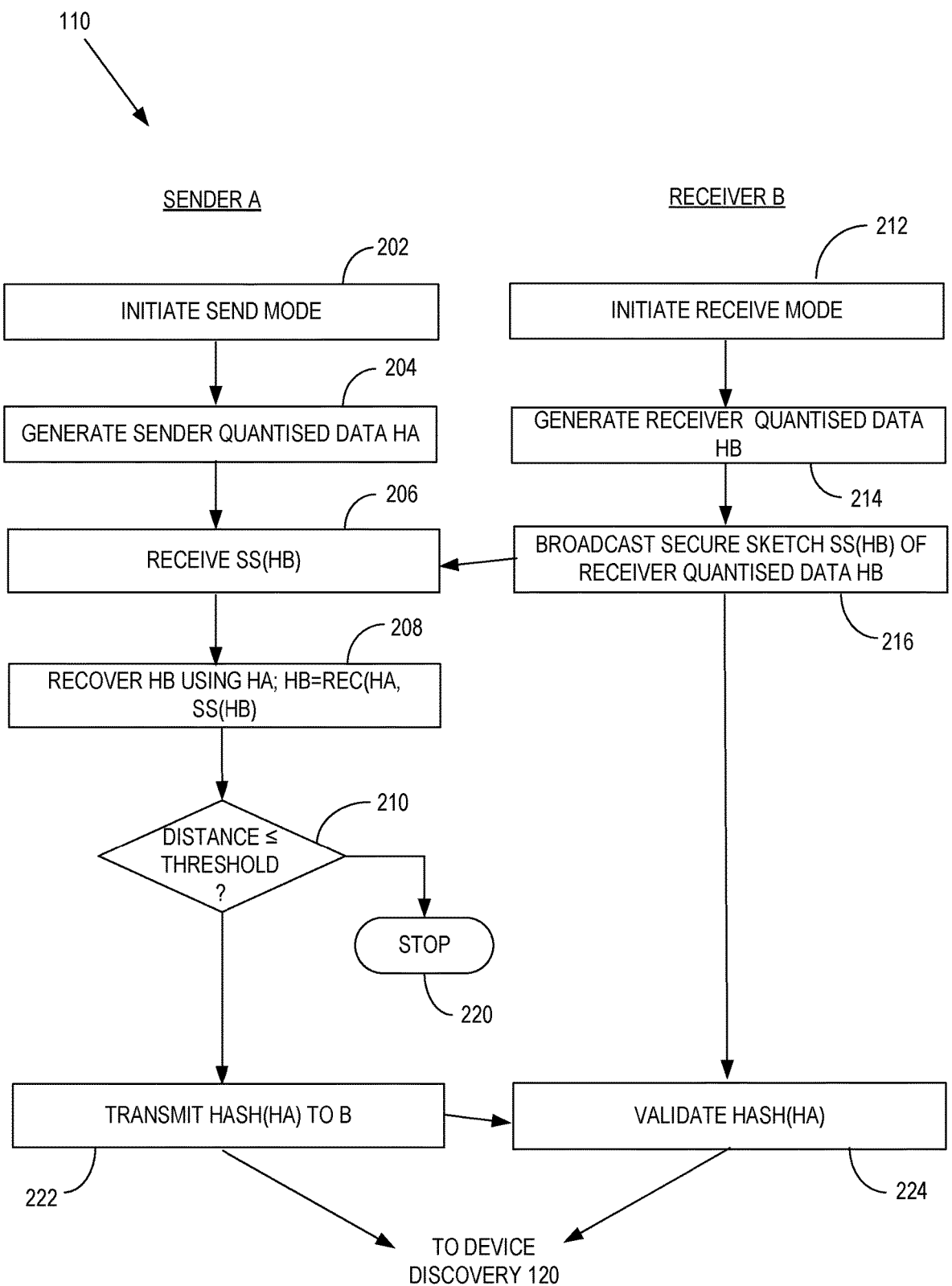
FIG. 3 is a flow diagram of an example proximity authentication process in the method of FIG. 2.

FIG. 3 shows steps performed by sender A and receiver B as part of proximity authentication 110.

At step 202, sender A initiates send mode. As part of this step, or shortly thereafter, sender A may receive a selection of one or more files that are to be sent to a receiver. Receiver B prepares to receive data by initiating receive mode, at step 212. This is done asynchronously with A entering send mode.

Next, at step 204, sender A generates sender proximity data indicative of signals of nearby access points (as measured at A), and at step 214, receiver B generates receiver proximity data indicative of signals of nearby access points (as measured at B).

Figure 4:
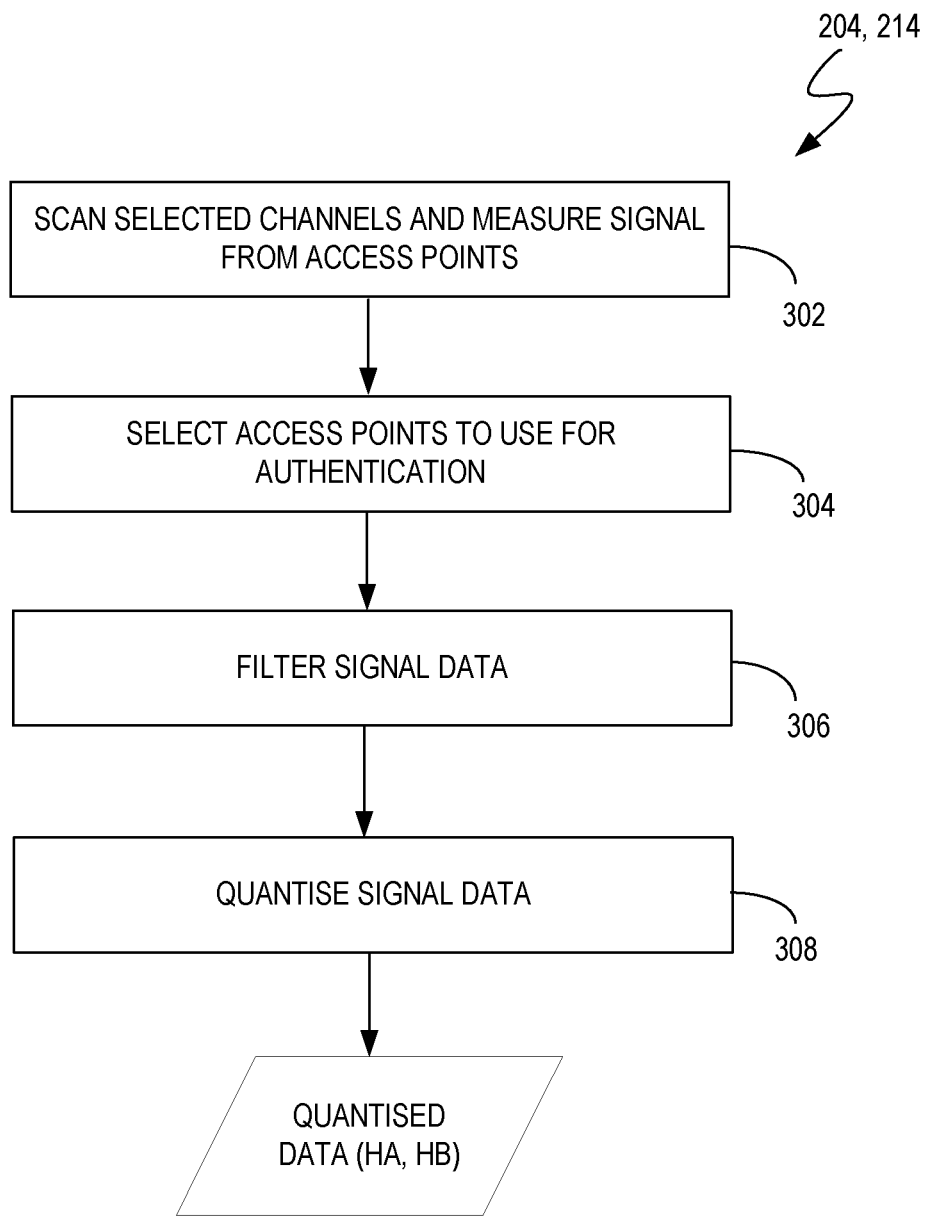
FIG. 4 is a flow diagram of an example signal quantisation process of the proximity authentication process of FIG. 3.

The proximity data generation process is shown in more detail in FIG. 4, and will be described with reference to sender A, though it will be appreciated that receiver B performs substantially the same process. At step 302, A scans 802.11 channels, or a subset thereof (e.g. the top N most popular channels), to detect nearby APs. Signals from the detected APs are measured for t time units, where t may be selected such that the total scan time is of the order of milliseconds. The signal measurements may be RSSI values, for example. After t time units, each device has a 2-D matrix of measured channel values, across time and visible APs, K, which is represented as $h_a, [t \cdot ch][K] \leftarrow [h_{ap_1}(1:t \cdot ch), h_{ap_2}(:), \ldots, h_{ap_k}(:)]$.

In some embodiments, selective channel scanning may be performed using a utility such as iw, which is a nl80211 based, CLI configuration utility for wireless devices. iw supports selective frequency scan and is fast enough as well since it directly communicates with the NIC driver using nl80211 and cfg80211 libraries. An example invocation is: iw dev wlan0 scan freq 2412 2437 2462

Basically, a probe request is broadcast as iw conveys a frequency list and scan command to the NIC driver. When an AP in range receives this request, it replies using a probe response containing the AP information: SSID, channel, capabilities, and other information.

The scanning performed at step 302 may start as soon as the data sharing application is initiated, and may continue until the data to be shared has been selected, or for a predetermined duration, to provide sufficient time to collect a large enough set of samples to ensure that a long enough (and thus secure enough) binary string is generated for the authentication. A scan time of between about 14 and 22 seconds, when conducted by a typical smartphone in accordance with the present disclosure, is typically sufficient to collect 15 samples or more per AP.

At step 304, sender A may select a subset of access points to use for authentication. The subset may be selected based on security considerations. For example, assuming that an eavesdropper E is attempting to impersonate one of the parties, the following quantity may be considered:

$$\rho_{secret}(\phi) = \rho_{ba} - \rho_{be} = J_0^2\left(2\pi\frac{\phi_A^2 \delta d_A}{16\lambda}\right) - J_0^2\left(2\pi\frac{\phi_E^2 \delta d_E}{16\lambda}\right). \quad (1)$$

Figure 11:
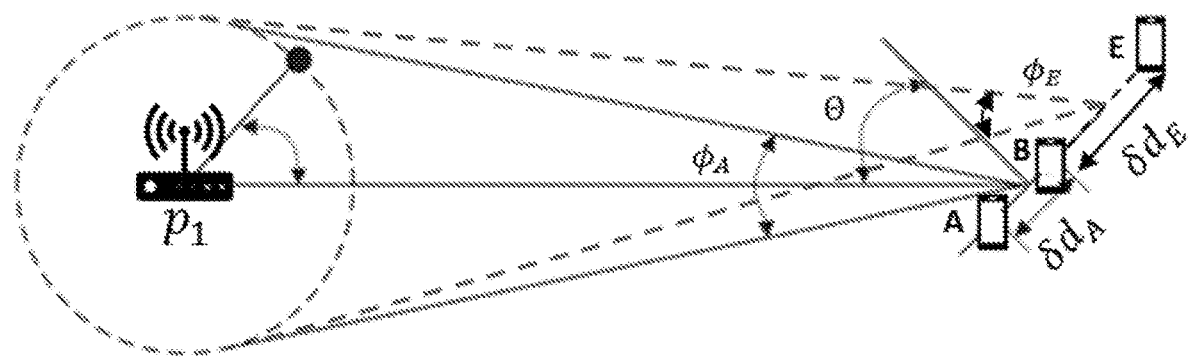
FIG. 11 is a schematic depiction of two devices A and B seeking to share data in the presence of an eavesdropper E.

In Eq. (1), $\rho_{ba}$ is the envelope correlation between sender A and receiver B, $\rho_{be}$ is the envelope correlation between receiver B and eavesdropper E, $\delta d_E$ is the distance between receiver B and eavesdropper E, $\phi_A$ is the angular range of an AP with respect to the pair A-B, and $\phi_E$ is the angular range with respect to the pair B-E, as shown in FIG. 11. $\rho_{secret}(\phi)$ helps to understand deviation between channel observations at A(B) and E with respect to separation and angular range.

Figure 12:
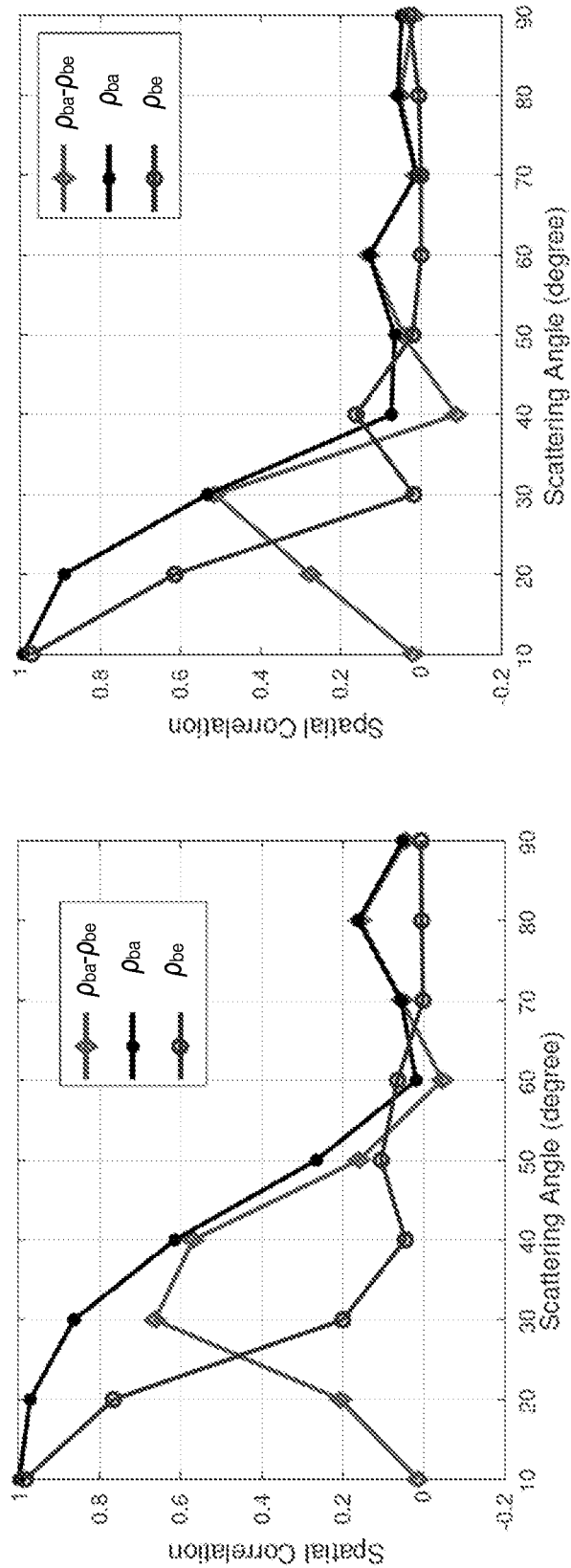
FIG. 12 shows two graphs of secret correlation for a pair of devices, at two different separations between the devices.

$\rho_{secret}(\phi)$ for various separation distances between pairs is plotted in FIGS. 12(*a*) and 12(*b*). It can be concluded from the plots that not all scattering angles are favourable for high secret correlation. Two important inferences from FIGS. 12(*a*) and 12(*b*) are: there exists an optimal $\phi$ corresponding to a given distance of separation; and with increasing separation distance, it is wiser to choose APs with smaller angular range (FIG. 12(*b*)).

In practice, angular range depends on two factors: a pair's distance from the AP, and scatterer orientations. As the authenticating pair, A and B, moves closer to an AP, its angular range increases. It can be observed that for even very short separation 5λ=60 cm, envelope correlation decreases sharply for higher angular range, FIG. 12(*a*). These observations imply that it may be advantageous, for improving security, to select APs which are neither very far from nor very close to the pair. Far APs, i.e. the ones with small angular range, have significantly lower channel magnitude and low variation range across time. That is, irrespective of which AP we choose, it has an almost similar envelope at A, B and E and hence will have less secure correlation. APs at large angular range would have low envelope correlation for both pairs. To overcome this trade off, devices which are participating in authentication may filter out APs corresponding to these angles i.e., drop far and near APs, at step 306. The channel measurement matrix then reduces to $h_a[t \cdot ch][K']$ where $K' \leq K$.

Once the channel measurement matrix corresponding to the reduced set of APs is obtained, the signal data (RSSIs) of the channel measurement matrix may be quantised, at step 308. For example, the respective means of RSSIs for respective APs may form the final feature vector. After collecting channel measurements and filtering at step 306, averaging may be done over the t time units for each of the APs, resulting in feature vectors $h'_a[K]$ and $h'_b[K]$. The array may then be normalised and quantised to binary values using a multilevel quantiser. The resultant array thus formed is represented as $h''_{a/b}[K'] \leftarrow Qu(h'_{a/b}[K'])$, where $Qu(\bullet)$ is a quantisation function.

Thus, at the end of step 204, sender A is in possession of quantised data HA, and at the end of step 214, receiver B is in possession of quantised data HB.

Returning to FIG. 3, once receiver B is in possession of the quantised data HB, a secure sketch SS(HB) of the quantised data may be broadcast as a challenge, at step 216. At step 206, sender A receives the secure sketch SS(HB), and attempts to recover B's quantised data using its own quantised data, by executing a Recover procedure, Rec(HA, SS(HB)). The distance between the result of the Recover procedure and HA is then computed and compared to a threshold defined by the secure sketch procedure, at step 210. If the distance exceeds the threshold then the two binary arrays do not match and authentication fails (block 220). Otherwise, sender A generates a hash of its quantised data HA and transmits this to receiver B, at step 222. Receiver B then validates the hash, by generating a hash of its quantised data HB and comparing the generated hash to the received hash at step 224. Once hash verification has been completed, sender A and receiver B are ready to proceed to device discovery 120.

At this point, or at some later point in the process 100 before operation 130, sender device A and/or receiver device B may prompt the respective users to start gesturing (e.g. by waving) with their devices. This is to introduce randomness into the signal measurements for the shared secret agreement operation 130, as will be explained in further detail below.

Figure 5:
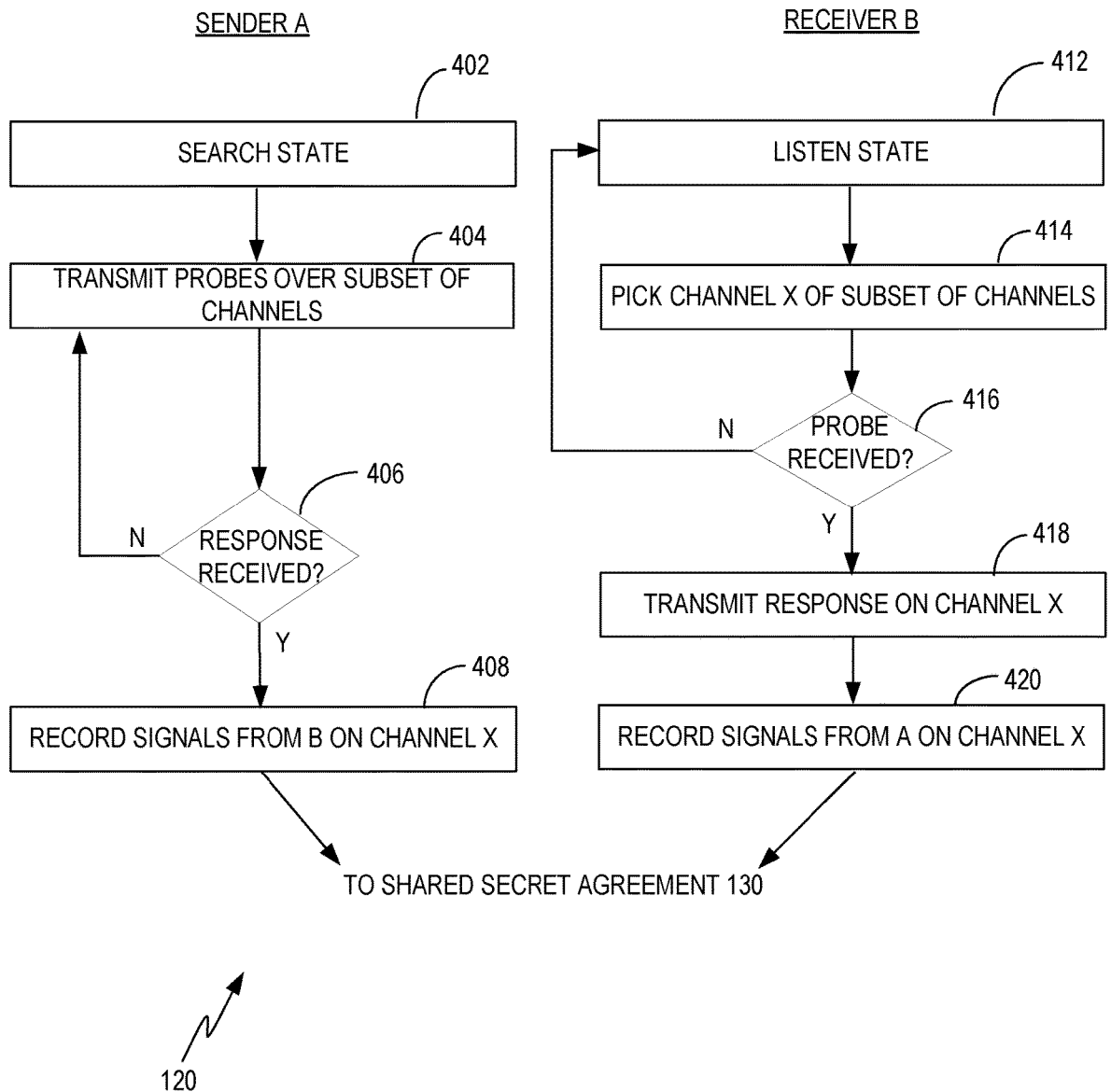
FIG. 5 is a flow diagram of an example device discovery process in the method of FIG. 2.

Turning now to FIG. 5, device discovery 120 begins with sender A being set in a search state (block 402) and receiver B in a listen state (block 412). This is to be contrasted with conventional device discovery in WiFi Direct, in which A and B alternate between search and listen as they exchange probes and responses. By setting the sender in search state and receiver in listen state, same state collision, and thus delay, is avoided during probing. The probe-response exchange is illustrated schematically in FIG. 6.

In some embodiments, modifications in various P2P operations may be implemented using the BCMDHD NIC driver. For example, wpa_supplicant, a user-space Wi-Fi based program, may be used to issue commands for various D2D (P2P) operations and fetch readings for corresponding commands directly from the driver. Whenever the driver receives and identifies a P2P probe frame, a corresponding event is generated which fetches probe and channel details and submits it to the upper layer of the Wi-Fi stack. The mechanism according to some embodiments may be implemented at this point to capture information like address and RSSI value of participating P2P device and hands over all data to the upper layer. In congruence with the aforementioned modifications, the kernel of the smartphone may be modified to make it suitable for the present use case where it can be guaranteed that each TDD channel measurement takes place within ~3 ms.

At block 404, sender A begins to transmit probes over the subset of channels that were used for proximity authentication 110. Meanwhile, receiver B chooses one of those channels to listen on, at block 414. For example, the listening channel may be chosen randomly.

Figure 6:
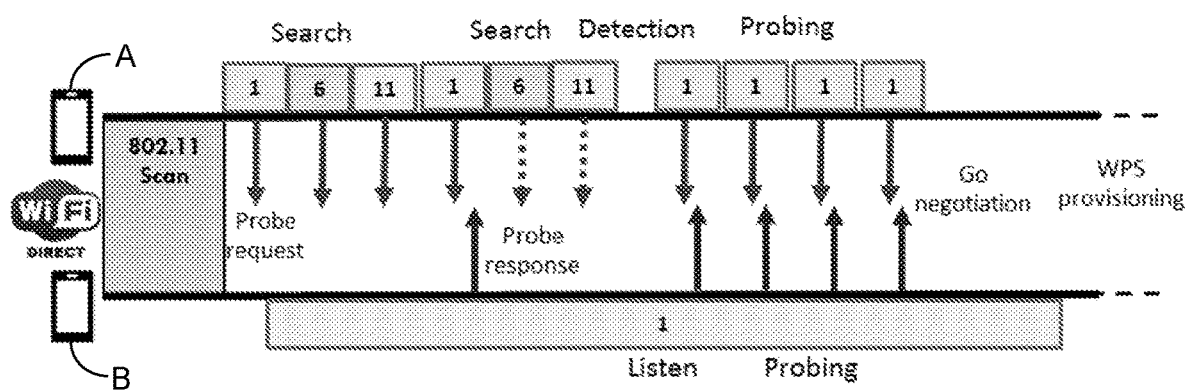
FIG. 6 is a schematic depiction of a probe and response flow in the device discovery process of FIG. 5.

As shown in FIG. 6, the search state operation is configured such that it restricts itself only to the channel on which the first probe from other device, in search mode, was detected. This is also shown in the flow diagram of FIG. 5. At block 416, receiver B in listen mode checks whether it has received any P2P probes. If not, it remains in listen state (block 412). If a probe is received, then B transmits a response on its selected channel, at block 418, to sender A. Sender A receives the response at block 406, and then sets the channel to be that on which the response was received. A then begins recording signals from B (block 408) and B starts recording signals from A (block 420). Each of A and B may record for up to a few seconds, e.g. for 1.5 seconds or less. The process shown in FIGS. 5 and 6 enables recording of ~70-90 readings per second on average, whereas the standard WiFi Direct process would have taken random time as long as 3 to 4 seconds for one pair of channel measurements.

Figure 7:
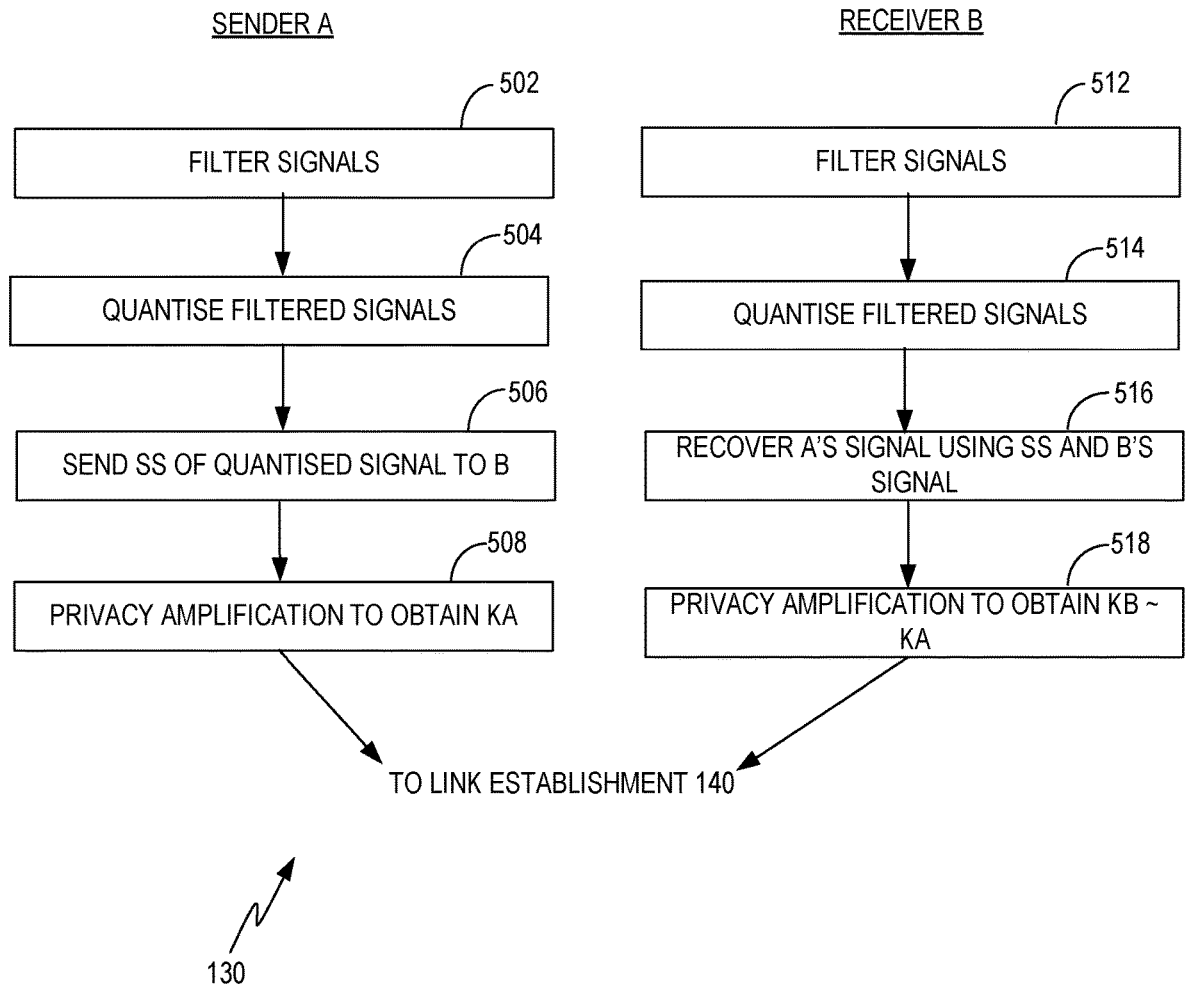
FIG. 7 is a flow diagram of an example shared secret agreement process in the method of FIG. 2.

A shared secret agreement operation 130 will now be described with reference to FIG. 7.

As mentioned above, A and/or B may gesture (e.g. by waving) as time-division-duplex (TDD) probing is taking place. The gesturing may occur for a small fraction of time, t units. A and B send probes and responses to each other in order to measure the respective channels, $P_{r_a}[t \cdot ns]$ and $P_{r_b}[t \cdot ns]$, where ns is the average number of probes per unit time. Due to reciprocity, two legitimate nodes have very similar channel arrays of exactly the same length, $h_{ab}$ and $h_{ba}$.

The property of wireless channel reciprocity ensures that $P_{r_a} \simeq P_{r_b}$ and its relation with relative antenna orientation facilitates sufficient randomness in the measurement. It has been found that appreciable changes in magnitude of power, measured at B, can occur as A gestures and the orientation of the smartphone switches between vertical and horizontal. Further, channel measurements may have fluctuations due to noise from the RF chain and the environment. Reciprocity may be affected by RF chains of different makes.

In order to suppress these variations and ensure tight reciprocity, both nodes A and B may filter their observations (blocks 502 and 512), $h_{filt_a} \leftarrow$ filter $(h_{ab})$. Any suitable smoothing filter, such as a Kalman filter, Savitzky-Golay filter, or moving average, may be used for the filtering operation.

In order to use the randomness introduced by gesturing for generation of a secret key, both A and B need to perform quantisation of the signal array $h_{filt_a}$. Usage of smartphones from different vendors would lead to a small loss of perfect reciprocity. As binary quantisation would lead to high secret bit-mismatch, and to counter deviations of $h_{filt_a}$ and $h_{filt_b}$ from one another, shape similarity-based quantisation is performed (blocks 506 and 516). Although signal levels can vary and have local fluctuations, the overall shape is consistent due to reciprocity.

Figure 13:
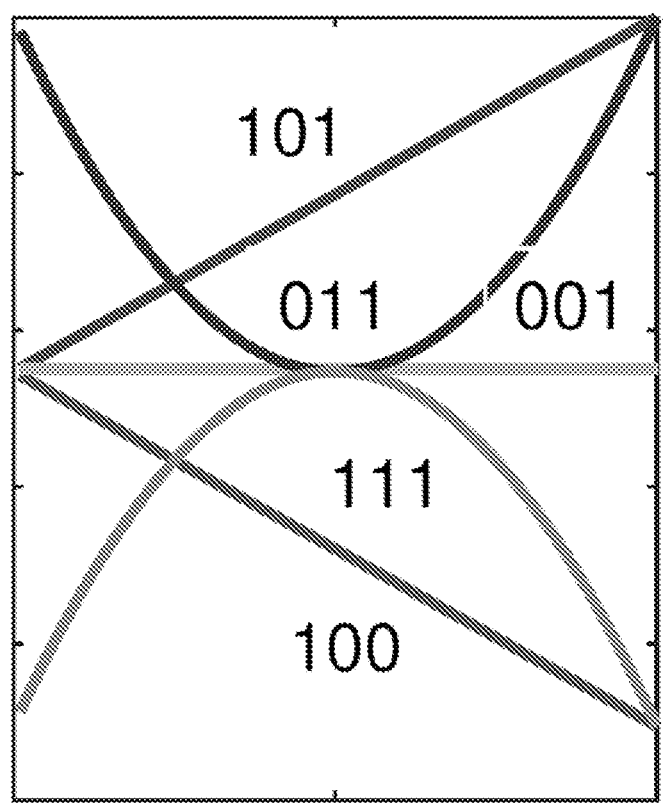
FIG. 13 is a schematic depiction of Frechet distance-based quantisation.

In shape similarity quantisation, the signal array is segmented in windows of w samples. Each window is compared with 5 known shapes, each corresponding to a unique binary string, as shown in FIG. 13. Frechet distance may be used to compare shape similarity. Post-quantisation, each participating node A, B is left with a secret binary string, $Bin_a[t \cdot ns/w] \leftarrow Qu_{Frechet}(h_{filt_b}[t \cdot ns])$. Here $Qu_{Frechet}(\bullet)$ is the Frechet distance-based quantisation function as shown in FIG. 13.

$Bin_a$ might not be perfectly equal to $Bin_b$ and there might be redundancy in generated bits. This happens because of subtle fluctuations in channel observations introduced due to rapid motion of hands/phone and heterogeneous RF chains across different smartphones. Accordingly, embodiments of the present disclosure adopt Fuzzy-Extractor based shared randomness extraction, to handle the discrepancy bits. Secure Sketch-based randomness extraction and error-correction may be used. At block 506, A sends $SS(Bin_a)$ to B, and at block 516, B uses $SS(Bin_a)$ to recover error in bits using a recovery function, $Bin_a \leftarrow Rec(SS(Bin_a), Bin_b)$. By design of $SS(\bullet)$, an eavesdropper E with a considerably different bit-string, $Bin_e$, cannot recover the same string.

At blocks 508 and 518, privacy amplification may be used by A and B respectively to further compress the randomness. Accordingly, A and B obtain final key strings denoted by $K_a$ and $K_b$, where $K_a \simeq K_b$. The secret keys obtained at A and B are then used to establish a secure D2D connection (block 140 of FIG. 2), for example using WPS.

Figure 8:
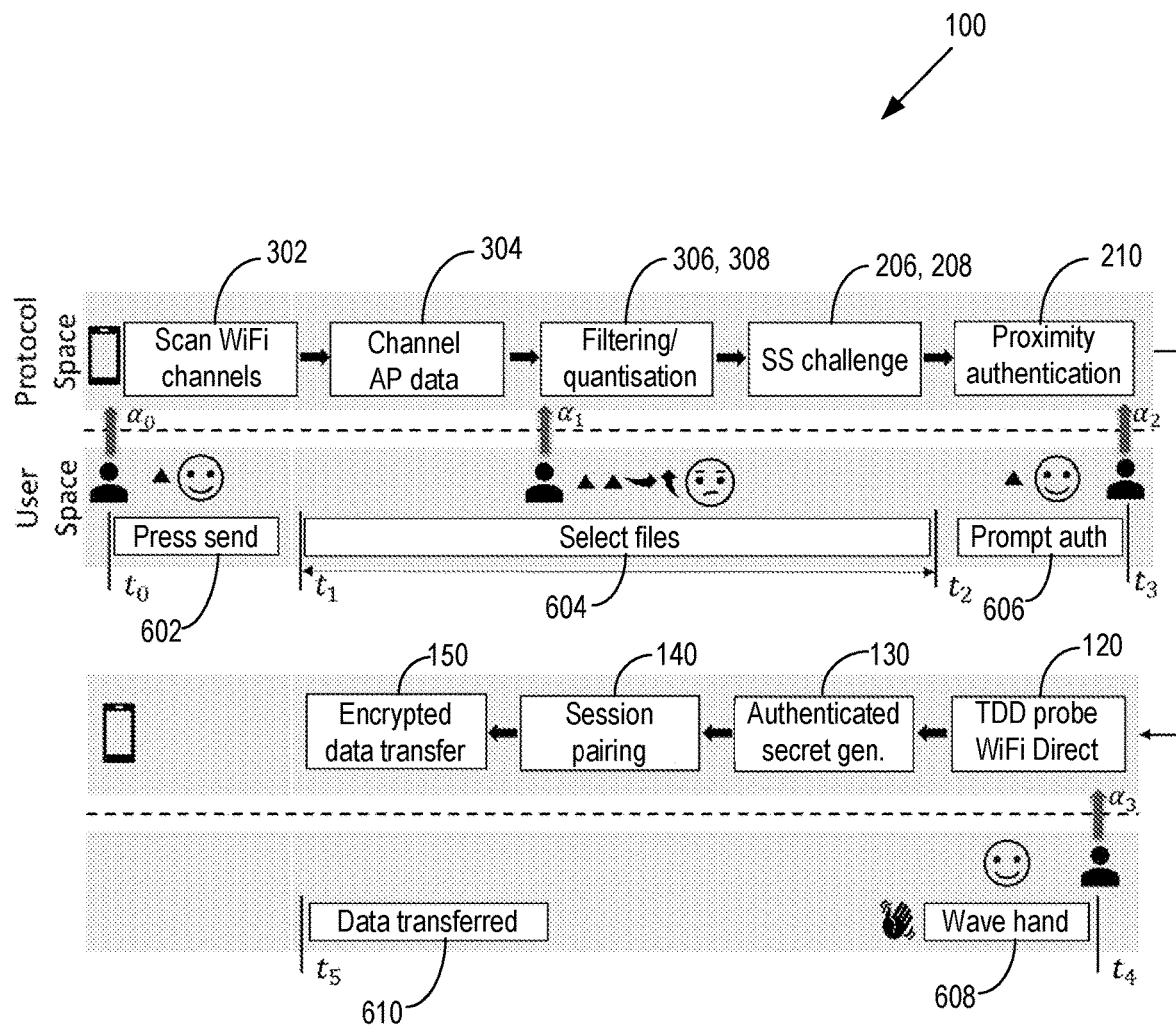
FIG. 8 shows an example of a user journey in a method for establishing a direct wireless communication link between the user's device and another device.

An alternative depiction of a data sharing process is shown in FIG. 8, which shows a sequence of operations performed in protocol space (by the sender device A), and in user space (by the user of sender device A). In FIG. 8, the $t_i$ denote times of specific events, and the $\alpha_i$ indicate user inputs received by sender device A. Although the process of FIG. 8 is shown from the sender perspective, it will be understood that a similar process is performed by the receiver.

Reference numerals in FIG. 8 map to those used in FIGS. 2 to 7, though additional reference numerals indicating user interface actions are also shown.

As described above, process 100 may start with the user initiating (602), at time $t_0$, send mode in a software application executing on sender device A, which triggers scanning of WiFi channels at step 302. At time $t_1$, the user begins to select (604) files to send to B, and device A commences the data analysis, filtering and quantisation steps 304, 306 and 308. Meanwhile, B is in receive mode and has carried out the same operations, and broadcasts the secure sketch challenge. Device A performs steps 206 and 208 of FIG. 3, resulting in proximity authentication being completed (210) at time $t_2$. At time $t_3$, the user may optionally be prompted to confirm authentication. Once confirmed (or if no confirmation is requested), at time $t_4$, this initiates the device discovery operation 120. The user is also prompted to wave his or her hand, and does so (608). The user of receiver device B may also be prompted to wave his or her hand at this point (not shown). Devices A and B then complete shared secret generation 130, link establishment 140, and A sends the encrypted file(s) to B at 150. A "data transferred" confirmation is then displayed (610) to the user at time $t_5$.

Figure 9:
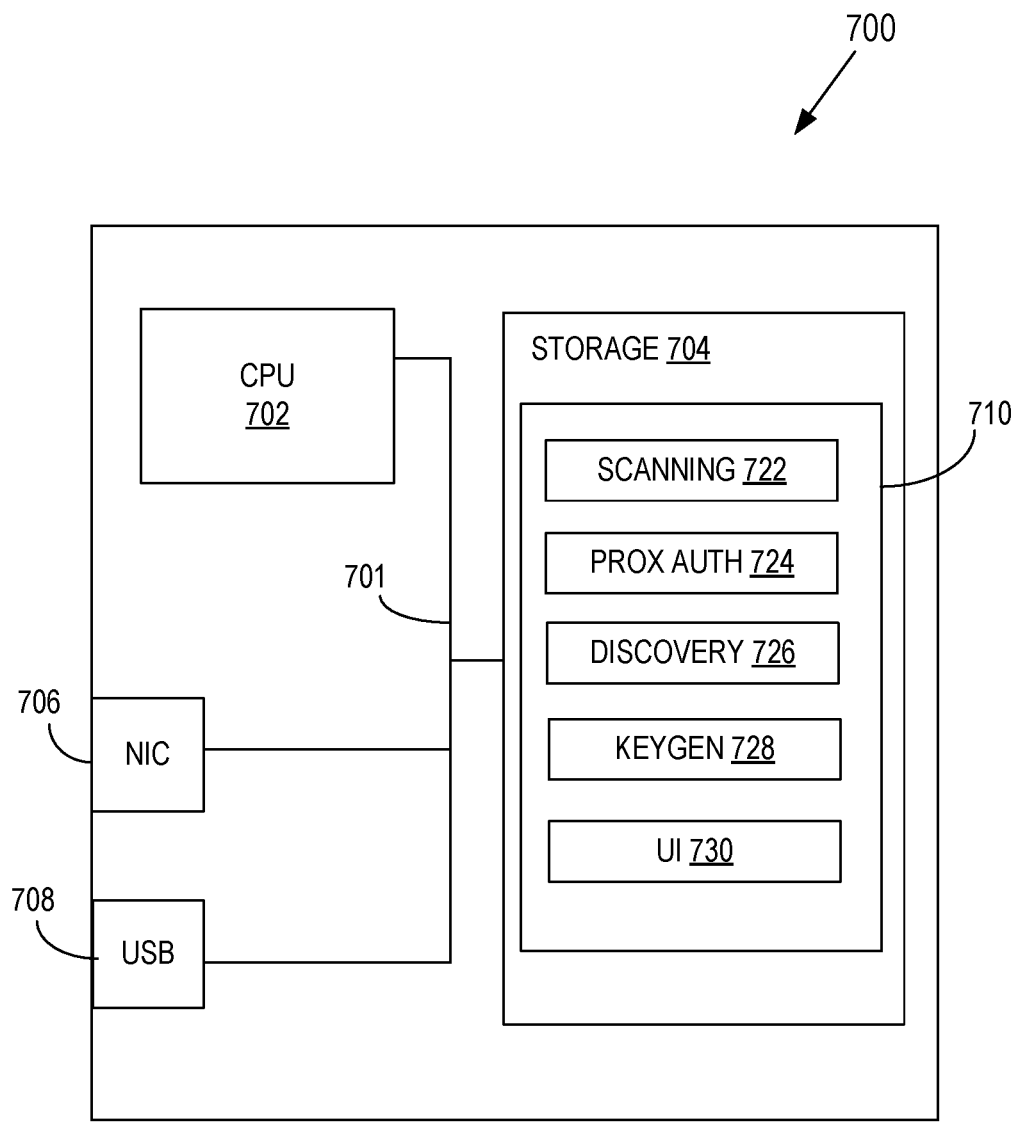
FIG. 9 shows an example architecture of a computing device suitable for performing the method of FIG. 2.

A high level architecture of an example device 700 capable of direct wireless communication is shown in FIG. 9. The device 700 may play the role of either sender or receiver as appropriate. For example, the device 700 may be in the form of a smartphone, smart watch, or other mobile computing device.

The device 700 comprises at least one processor 702 that is in communication with at least one storage medium 704. The security device 700 also comprises at least one network interface component 706, and optionally may comprise other interface components, such as USB interface 708. The at least one processor 702 may be in communication with storage 704, NIC 706 and USB 708 via a bus 701, for example.

The at least one storage medium 704 stores programming instructions of one or more software components or modules 710 to cause the at least one processor 702 to execute the processes and/or methods of the present disclosure. At least parts of the software modules 710 could alternatively be implemented as one or more dedicated hardware components, such as application-specific integrated circuits (ASICs) and/or field programmable gate arrays (FPGAs).

The modules 710 may comprise one or more of the following:

a scanning module 722 that scans one or more RF channels to collect signals from wireless access points for use in proximity authentication and shared secret generation;

a proximity authentication module 724 for analysing scanned signals and generating proximity authentication data therefrom as part of proximity authentication process 110;

a device discovery module 726 for causing the transmission of probes and/or responses during device discovery 120, and for managing GO negotiation between devices;

a keygen module 728 for generating shared secret KA/KB during shared secret agreement process 130; and a user interface (UI) module 730 for enabling, amongst other things, a user to initiate send mode and select one or more files to be sent to another device, or to initiate receive mode to receive one or more files from the other device, as well as to receive prompts from one or more other modules during a link establishment or data transfer process, such as proximity authentication module 724, device discovery module 726, or keygen module 728.

The at least one storage medium 704 also stores cryptographic data and functions for facilitating execution of the processes and/or methods of the present disclosure. For example, storage medium 704 may store a secret key (session key) generated during shared secret agreement 130. In some embodiments, applications or application components used for cryptographic operations, including shared secret generation 130, may be stored in a secure area of the storage medium 704, a separate secure storage medium, and/or in a Trusted Execution Environment (TEE) of a processor 702.

Figure 10:
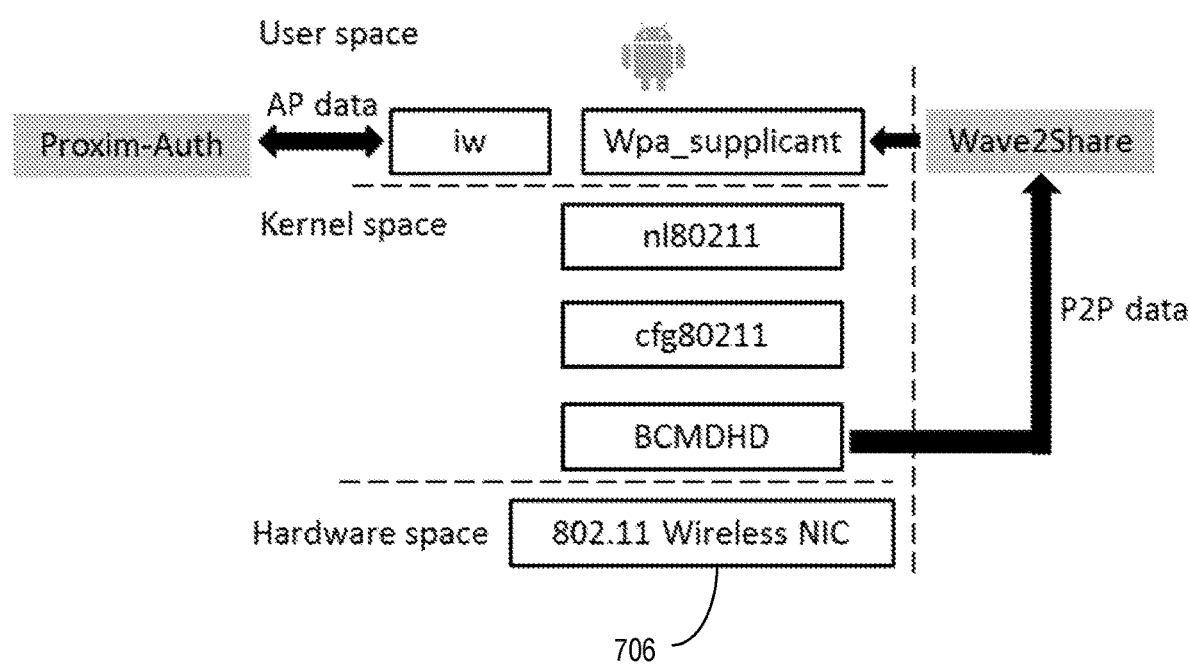
FIG. 10 is another architecture diagram showing a particular example of components of the computing device, in an Android implementation.

The device 700 may comprise a plurality of standard software modules (not shown), including an operating system such as Linux or Android, and one or more libraries that provide standard networking functionality. For example, in an Android-based implementation as shown in FIG. 10, the device may comprise a NIC driver such as BCMDHD, nl80211 and cfg80211 libraries, a supplicant such as wpa_supplicant, and a wireless configuration utility such as iw. It will be understood that in other implementations, each of these components may be replaced with equivalents that perform substantially the same functionality.

As shown, the modules 710 are implemented in the application layer, but it will be appreciated that in other embodiments, it is possible to implement one or more of the modules 710 in the kernel space for better performance. Further, one or more of the modules 710 may alternatively be implemented in a TEE of processor 702.

The boundaries between the modules and components in the software modules 710 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of the processes (of FIGS. 2 to 8) performed by the device 700 may be executed by a module (of software modules 710) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The security device 700 normally processes information according to a program (a list of internally stored instructions such as a particular application program and/or an operating system) and produces resultant output information, for example via input/output (I/O) devices such as NIC 706. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Many modifications will be apparent to those skilled in the art without departing from the scope of the present invention.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A method of establishing a direct wireless communication link between a first device and a second device, the first device being designated as a sender and the second device being designated as a receiver, the method comprising:

a proximity authentication operation that comprises determining, based on signals received by the first and second devices over one or more RF channels from a plurality of wireless access points, that the first device is proximate the second device;

following the proximity authentication operation, a key generation operation that comprises: generating a shared secret by performing randomness extraction on respective signals received at the first and second devices over a selected channel of the one or more RF channels; and establishing the direct wireless communication link using the shared secret, wherein the proximity authentication operation comprises the second device broadcasting a secure sketch of signal data received by the second device from the plurality of wireless access points; and the first device determining, based on the secure sketch and on signal data received by the first device from the plurality of wireless access points, whether the first device is proximate the second device.

2. The method according to claim 1, wherein the direct wireless communication link is a WiFi Direct link.

3. The method according to claim 1, further comprising introducing, prior to the key generation operation, randomness in a physical layer of the first device or of the second device.

4. The method according to claim 3, wherein randomness is introduced by imparting movement to an antenna of the first device or an antenna of the second device.

5. The method according to claim 4, wherein said movement is imparted by a first user gesturing with the first device or a second user gesturing with the second device.

6. The method according to claim 1, comprising a device discovery operation that comprises:
the second device:
waiting in a listen state for a predetermined wait time in a current channel of said RF channels;
if no probe is detected from the first device during the predetermined wait time, setting the current channel to another of said RF channels;
if a probe is detected from the first device during the predetermined wait time from the first device, sending a response to the first device over the current channel; and
the first device setting, responsive to the response from the second device, the current channel as a search state channel.

7. The method according to claim 1, wherein the proximity authentication operation comprises scanning for said plurality of wireless access points over a subset of frequently used channels.

8. The method according to claim 1, wherein the proximity authentication operation further comprises selecting, from said plurality of access points, a subset of access points that are suitable for authentication.

9. The method according to claim 8, wherein said selecting comprises discarding access points that have an angular range with respect to the first device and the second device that is smaller or larger than a range of angular ranges comprising an optimal angular range.

10. A device configured to establish a direct wireless communication link with another device, the device comprising at least one processor in communication with computer-readable storage that comprises instructions for causing the at least one processor to:
perform a proximity authentication operation that comprises receiving signal data from the another device, said signal data being indicative of signals received by the another device over one or more RF channels from a plurality of wireless access points; and determining, based on signals received by the device over the one or more RF channels from the plurality of wireless access points, that the device is proximate the another device;
following the proximity authentication operation, perform a key generation operation that comprises: generating a shared secret by performing randomness extraction on signals received at the device over a selected channel of the one or more RF channels; and
establishing the direct wireless communication link with the another device using the shared secret,
wherein the proximity authentication operation comprises:
when the device is in a send mode, receiving, from the another device, a secure sketch of signal data received by the another device from the plurality of wireless access points; and determining, based on the secure sketch and on signal data received by the device from the plurality of wireless access points, whether the device is proximate the another device.

11. The device according to claim 10, wherein the direct wireless communication link is a WiFi Direct link.

12. The device according to claim 10, comprising an antenna that is polarised such that movement of the device introduces randomness in thea physical layer of the device.

13. The device according to claim 10, configured to perform a device discovery operation that comprises:
when the device is in a send mode, successively transmitting probes over a plurality of channels until a first response is received from the another device over one of said channels, and responsive to the response from the another device, setting a search state channel to be the one of said channels; and
when the device is in a receive mode:
waiting in a listen state for a predetermined wait time in a current channel of said RF channels;
if no probe is detected from the another device during the predetermined wait time, setting the current channel to another of said RF channels;
if a probe is detected from the another device during the predetermined wait time, sending a response to the another device over the current channel.

14. The device according to claim 10, wherein the proximity authentication operation comprises scanning for said at least one access point over a subset of frequently used channels.

15. The device according to claim 10, wherein the proximity authentication operation further comprises selecting, from said at least one access point, one or more access points that are suitable for authentication.

16. The device according to claim 15, wherein said selecting comprises discarding access points that have an angular range with respect to the device and the another device that is smaller or larger than a range of angular ranges comprising an optimal angular range.

17. Non-transitory computer-readable storage having stored thereon instructions for causing at least one processor to perform a method according to claim 1.

* * * * *